Sept. 6, 1949.　　　　　　R. T. COLLIER　　　　　　2,481,201
FRUIT PIT CRACKING MACHINE WITH
SPACED, CORRUGATED ROLLERS
Filed Dec. 22, 1945　　　　　　　　　　　　2 Sheets-Sheet 1
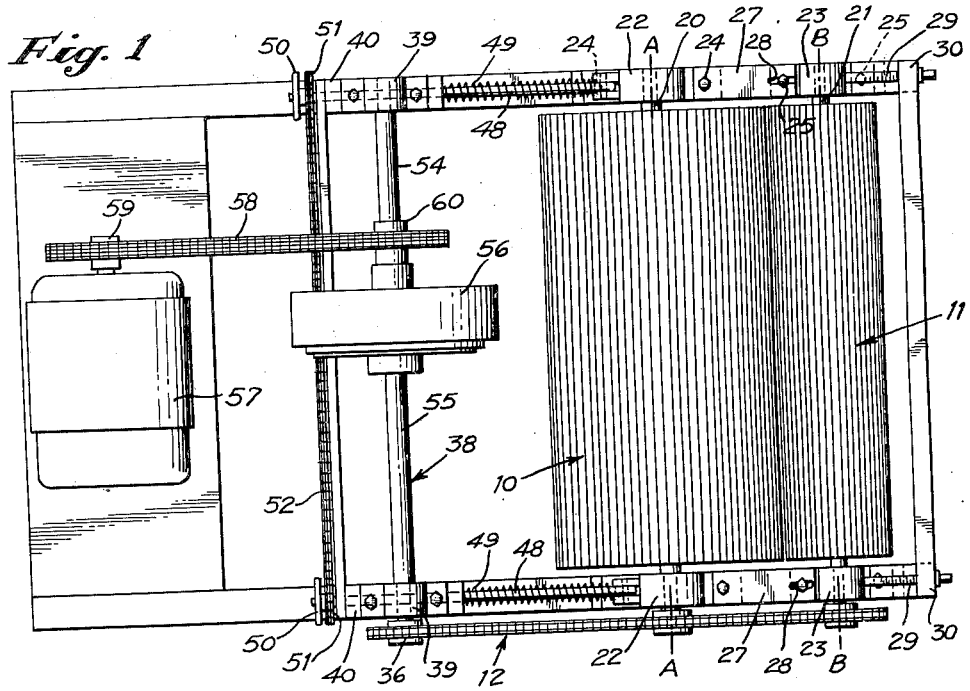
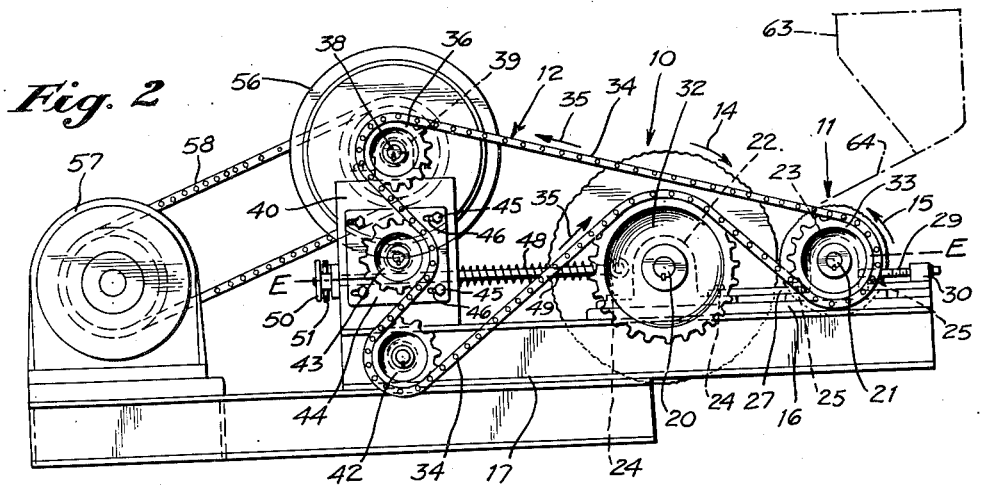
INVENTOR
ROBERT T. COLLIER
By HARRIS, KIECH, FOSTER & HARRIS
FOR THE FIRM
ATTORNEYS INVENTOR
ROBERT T. COLLIER
BY HARRIS, KIECH, FOSTER & HARRIS
FOR THE FIRM
ATTORNEYS Patented Sept. 6, 1949

2,481,201

UNITED STATES PATENT OFFICE 2,481,201

FRUIT PIT CRACKING MACHINE WITH SPACED CORRUGATED ROLLERS

Robert T. Collier, Palos Verdes Estates, Calif., assignor to R. T. Collier Corporation, Los Angeles, Calif., a corporation of California Application December 22, 1945, Serial No. 636,563

9 Claims. (Cl. 146—11)

My invention relates in general to machines or apparatus for cracking various articles having seeds, kernels, nut meats, or the like therein.

In cracking such articles as fruit pits and nuts, it is highly desirable that the kernels therein be released in whole or substantially whole form for various reasons. In the first place, the market value and salability of nut meats in particular are greatly enhanced if the nut meats are released in whole form during cracking operations. Furthermore, whole or substantially whole kernels are also highly desirable to facilitate separation of the kernels from fragments of the outer shell. Separating broken kernels from the shell fragments imposes a difficult problem, particularly if the kernels are crushed or mashed into the shell fragments.

In view of the foregoing considerations, a primary object of my invention is the provision of a machine for cracking such articles as fruit pits or nuts in such a manner that the major portion of the kernels contained therein are released in whole or substantially whole form.

Still another object of my invention is the provision of a cracking machine of this character which operates efficiently and economically and which has a relatively large capacity. A related object is to provide a cracking machine of relatively simple construction which may be operated for extended intervals without appreciable attention or maintenance.

In general, my invention includes a pair of spaced, corrugated, counter-rotatable cracking members or rollers having parallel axes of rotation, and includes means for rotating the cracking members in opposite directions. Although I am aware that cracking machines of this general construction have been developed heretofore, my invention embodies certain fundamental principles which result in a cracking machine that operates more effectively and efficiently than such prior machines.

An object of fundamental importance is the provision of a cracking machine having a pair of counter-rotating cracking members wherein the speed of the periphery, hereinafter termed peripheral speed, of one of the cracking members exceeds that of the other cracking member. As the fruit pits or nuts pass between the cracking members and are compressed therebetween, the cracking members also exert a shearing action on the fruit pits or nuts by virtue of the difference between the peripheral speeds of the members. The combined shearing and compressive actions result in the desired fracture of the outer shell and release of the kernel without excessively fracturing the kernel itself.

A further object of my invention is the provision of a cracking machine in which the ratio of the diameter of one cracking member or roller to the diameter of the other is equal to the ratio of the peripheral speed of said one cracking member to the peripheral speed of the other. This construction permits rotation of the two cracking members at the same rotational speeds, i. e., same number of revolutions during a given time interval, which is another object of my invention.

Still another object is to provide cracking members having corrugations or teeth thereon which are adapted to receive the fruit pits or nuts therebetween and are adapted to apply the desired combination of compressive and shearing forces thereto to fracture the outer shells thereof without damaging an excessive percentage of the kernels contained therein. Another and important object in this connection is the provision of cracking members having teeth thereon which divide the members into channels adapted to receive the fruit pits or nuts therein, the relative positions of the cracking members being such that the maximum clearance measured along a reference line perpendicular to and intersecting the axes of rotation of the members, between a channel in one member and an opposite or substantially opposite channel in the other member is equal to or less than the maximum width of the average fruit pits or nuts being cracked to insure fracture thereof. Still another object in this connection is the provision of cracking members having relative positions such that the minimum clearance measured along the aforesaid reference line, between a tooth on one member and an opposite or substantially opposite tooth on the other member is equal to or greater than the average maximum width of the kernels to prevent damage thereto.

An important object of my invention is to provide means for rotating the cracking members in perfect synchronism so that the desired relationship between the relative positions of the teeth and channels of one member and the teeth and channels of the other member obtains at all times.

An additional object is the provision of a cracking machine in which the spacing of the cracking members may be varied to accommodate fruit pits or nuts of various average maximum widths.

The foregoing objects and advantages of my invention, together with various other objects and advantages which will be apparent hereinafter, may be realized by means of the exemplary embodiments which are illustrated in the accompanying drawings and are described in detail hereinafter. The exemplary embodiments which are described in detail hereinafter are particularly adapted for cracking the hard outer shell, or endocarp, of the stones or pits of such drupaceous fruits as peaches, apricots, etc., to release the seeds or kernels therefrom. The kernels contained in the pits of various drupaceous fruits are utilized rather extensively to obtain various products of considerable commercial importance, artificial almond flavoring, for example, being derived from the kernels of peach pits. However, since the fundamental principles of my invention may also be applied to machines for cracking various other articles such as nuts of various types, it will be understood that the specific applications which are discussed hereinafter have merely been selected for convenience in disclosing the invention. Referring to the drawings, which are intended as illustrative only:

Fig. 1 is a plan view of a cracking machine which embodies the fundamental principles of my invention;

Fig. 2 is a side elevational view thereof;

Figure 4:
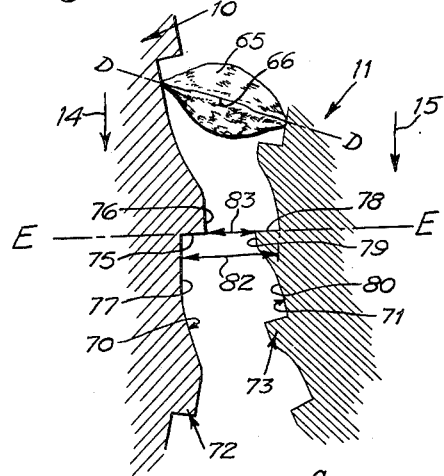
Figs. 4 and 5 are enlarged, fragmentary, sectional views illustrating the details of and the operation of cracking members which are particularly adapted for cracking peach pits.

Referring particularly to Figs. 1 and 2, the cracking machine includes a pair of spaced, corrugated, cracking members 10 and 11 which are rotatable about parallel axes of rotation A—A and B—B, respectively, and includes means 12 for rotating the cracking members 10 and 11 in synchronism and in opposite directions as indicated by the arrows 14 and 15, respectively. The cracking members 10 and 11 are preferably cylindrical wheels or rollers, and are provided with peripheral corrugations thereon which are shown in detail in Figs. 4 and 5 and will be described in connection therewith hereinafter.

As best shown in Fig. 2, the ratio of the diameter of the roller 10 to the diameter of the roller 11 is greater than unity, the diameter ratio being approximately 2 to 1 in the particular construction illustrated although it will be understood that other ratios may also be employed if desired. The rotating means 12 is adapted to drive the rollers 10 and 11 in the directions indicated by the arrows 14 and 15, respectively, at the same rotational speeds so that the peripheral speed of the roller 10 exceeds that of the roller 11, the ratio of the peripheral speed of the roller 10 to the peripheral speed of the roller 11 being equal to the ratio of the respective diameters thereof.

In the particular construction illustrated, the rollers 10 and 11 are rotatably mounted on a roller base 16 which is preferably reciprocable relative to a frame 17 for reasons to be discussed hereinafter, the roller base being reciprocable along suitable tracks or the like which are not specifically shown in the drawings. The rollers 10 and 11 are mounted on spaced, parallel shafts 20 and 21, respectively, which are journalled in bearing members 22 and bearing members 23, respectively, the bearing members 22 and 23 being rigidly secured to the roller base 16 by bolts 24 and 25, respectively. The bearing members 22 and 23 are rigidly interconnected by clamping members 27 which are secured thereto by the bolts 24 and 25 to insure the maintenance of a predetermined spacing of the rollers 10 and 11. Two of the bolts 25 extend through slots 28 in the clamping members 27, and all of the bolts 25 extend through similar slots (not shown) in the roller base 16 to permit displacement of the roller 11 relative to the roller 10 to vary the spacing therebetween as required. The bearing members 23 may be displaced to displace the roller 11 by means of rotatable, threaded rods or shafts 29 which are suitably connected to the bearing members and are threaded into complementarily threaded bores in rigid stanchions 30 on the roller base 16. Thus, the spacing of the rollers 10 and 11 may be varied by loosening the bolts 25, rotating the rods 29 until the roller 11 is displaced into the desired position, and then tightening the bolts to secure the roller 11 in that position.

Sprockets 32 and 33 are mounted on and rigidly secured to the shafts 20 and 21, respectively, the sprockets preferably being of the same diameter so that the rotational speeds of the rollers 10 and 11 in the directions indicated by the arrows 14 and 15, respectively, will be identical when the sprockets are driven by an endless chain 34 which is driven in the direction of the arrows 35 by a driving sprocket 36. The chain 34 is trained over the sprocket 32 and under the sprocket 33 in the particular construction illustrated so that the rollers 10 and 11 will be driven in the directions indicated when the chain is driven in the direction of the arrows 35. The use of a single chain 34 to rotate both rollers 10 and 11 insures that the rollers will be synchronized at all times. The chain 34 is trained over the driving sprocket 36, which is mounted on and keyed or otherwise rigidly secured to a drive shaft 38, the drive shaft being journalled in bearing members 39 which are suitably secured to stanchions 40 on the frame 17. The chain 34 is also trained over idling sprockets 42 and 43, the idling sprocket 42 being rotatably mounted on the frame 17, and the idling sprocket 43 being rotatably mounted on a movable plate 44. The plate 44 is secured to one of the stanchions 40 by bolts 45 which extend through slots 46 in the plate to permit adjustment of the tension in the chain 34. The tension in the chain 34 may be adjusted further by displacing the roller base 16 along the frame 17 relative to the stanchions 40 by means of a pair of shafts or rods 48 which are connected to the bearing members 22 and extend through the stanchions. Compression springs 49 encircle the rods 48 and urge the roller base 16 away from the stanchions 40 to maintain tension in the chain 34, the maximum tension therein being regulated by a pair of hand wheels 50 which are threaded on the rods 48 and are adapted to displace the roller base toward the stanchions upon rotation of the hand wheels. In order to maintain the chain 34 and sprockets 32, 33, 36, 42, and 43 in alignment, the hand wheels 50 are provided with sprockets 51 thereon and are synchronized by a chain 52 which is trained around the sprockets 51, thus insuring that both ends of the roller base 16 will be displaced the same distance to maintain the correct alignment whenever the tension in the chain 34 is varied.

The drive shaft 38 includes two sections 54 and 55 which are interconnected by a suitable speed reduction unit 56, the shaft section 54 being driven by a motor 57 through a chain 58. The chain 58 is trained over sprockets 59 and 60 which are mounted on and secured to the motor shaft and to the shaft section 54 of the drive shaft 38, respectively.

It will be understood that the rotating means 12 described heretofore is intended as illustrative only since various other means may be employed for rotating the rollers 10 and 11. For example, the sprocket and chain system illustrated may be replaced by a pulley and belt system (not shown) or a suitable gear system (not shown), if desired.

Figure 3:
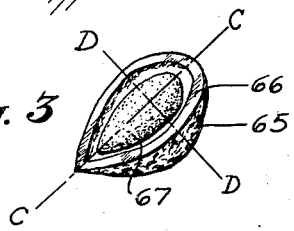
Fig. 3 is a perspective view of one-half of a fruit pit.

As best shown in Fig. 2, the fruit pits or other articles to be cracked may be contained in a suitable hopper 63, and allowed to slide or roll down an incline 64 onto the roller 11 which then carries the fruit pits between the rollers 10 and 11. The rollers 10 and 11 are particularly adapted for cracking such fruit pits as peach pits 65, one-half of a typical peach pit being illustrated in Fig. 3. The peach pit 65 may be regarded as having a major axis C—C which coincides with the maximum longitudinal dimension or length thereof, and may be regarded as having a minor axis D—D which coincides with the maximum lateral dimension or width thereof, the axes C—C and D—D being in the natural cleavage plane of the pit which is indicated by the numeral 66. The outer shell or endocarp of the peach pit 65 contains a seed or kernel 67 having a maximum length and width which may be regarded as coinciding with the major and minor axes C—C and D—D, respectively, for convenience, although this assumption may only be approximately accurate in many cases because of the non-uniformity of the peach pits and kernels.

Figure 5:
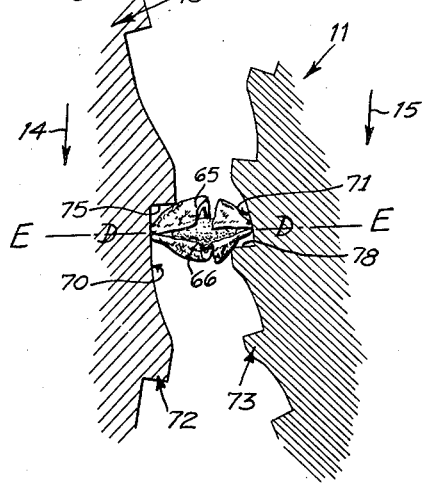

As best shown in Figs. 4 and 5, the rollers 10 and 11 are provided with grooves or channels 70 and 71 therein, respectively, which define teeth 72 and 73, respectively, the teeth being parallel to the axes of rotation A—A and B—B. Each tooth 72 includes a radial face 75 and a tangential face 76, the radial face of one tooth being connected to the tangential face of an adjacent tooth by a generally S-shaped face 77 of reverse curvature. Each tooth 73 similarly includes a radial face 78 and a tangential face 79, the radial face of one tooth being connected to the tangential face of an adjacent tooth by a generally S-shaped face 80 of reverse curvature. The spacing between the rollers 10 and 11 and the depth of the channels 70 and 71 is such that the maximum clearance between a channel 70 in the roller 10 and an opposite or substantially opposite channel 71 in the roller 11 is equal to or less than the average maximum width of the pits 65, the maximum clearance which is indicated by the dimensional arrow 82 of Fig. 4, being measured substantially along the reference line E—E, which is perpendicular to and intersects the axis of rotation A—A and B—B of the rollers. The minimum clearance between a tooth 72 on the roller 10 and an opposite or substantially opposite tooth 73 on the roller 11 is equal to or greater than the average maximum width of the kernels 67, the minimum clearance being measured substantially along the reference line E—E and being indicated by the dimensional arrow 83 of Fig. 4. The spacing of the teeth 72 on the roller 10 is equal to or greater than the average maximum length of the kernels 67.

As a peach pit 65 is carried between the rollers 10 and 11 by the roller 11, the pit falls into the channels 70 and 71, and the major axis C—C thereof tends to become aligned with the axes of rotation A—A and B—B of the rollers so that the minor axis D—D thereof extends transversely of the rollers as shown in Fig. 4. As the rollers 10 and 11 rotate in the directions indicated by the arrows 14 and 15, respectively, the peach pit 65, which is disposed in the channels 70 and 71, is compressed between the rollers as shown in Fig. 5, since the maximum clearance between the channels 70 and 71 is less than the maximum peripheral width of the average pit. Since the peripheral speed of the roller 10 exceeds that of the roller 11, the radial faces 75 and 78 engage the pit 65 to shear the pit. Thus, the pit 65 is subjected to a combined shearing and compressive action which fractures the pit somewhat as indicated in Fig. 5 to release the kernel 67 therefrom. The combined shearing and compressive action occurs before corresponding teeth 72 and 73 on the rollers 10 and 11 are directly opposite each other so that the shell has been fractured and the kernel 67 released before the teeth are directly opposite, thus permitting the kernel to fall free before the distance between the teeth reaches its minimum. The combined shearing and compressive action actually causes a rather violent bursting or exploding of the shell which tends to throw the kernels 67 free of the shell fragments, thereby facilitating separation of the kernels from the shell fragments which is an important feature of the invention. The rotating means 12 synchronizes the rollers 10 and 11 so that the correct relative positions of the channels 70 and 71 and teeth 72 and 73 are maintained at all times.

There is a maximum speed for the rollers 10 and 11 above which the pits 65 may fail to align themselves properly with the channels 70 and 71. The principle involved is that as the pits 65 are carried between the rollers 10 and 11 by the roller 11, the pits tend to stand on edge and the action of gravity causes them to rotate outwardly toward the roller 10 approximately 45 degrees so that the major axes C—C thereof tend to become aligned with the axes of the rollers, there being no appreciable tendency toward alignment of the minor axes D—D with the axes of the rollers since it will be apparent that the pits will normally not stand on end. If the speed of the rollers 10 and 11 is too great, the pits 65 will not have sufficient time to become properly aligned and some mashing of the kernels 67 may result.

Since the minimum clearance between the teeth 72 and 73 is greater than the maximum width of the average kernel 67, the kernel is undamaged during the cracking operation, the kernel and fragments of the shell of the pit 65 being ejected from or falling from between the rollers 11 and 12 as the rollers rotate. Tests have indicated that approximately 95% of the peach pits 65 are fractured sufficiently to release the kernels 67 therefrom, substantially all of the kernels being undamaged by the cracking operation. The combined compressive and shearing action attained through the cooperation of the teeth 72 and 73 permits sufficient clearance between the rollers 10 and 11 that the kernels 67 are released in whole or substantially whole form and are not mashed into the fragments of the shell to any appreciable extent as is the case with many prior cracking machines. Since many conventional cracking machines rely solely on a compressive action in cracking operations, the articles cracked thereby must be segregated into many groups according to size to prevent undue mashing of oversize articles. My invention minimizes the necessity for grading since the teeth 72 and 73 will still apply a shearing force to undersize articles while the channels 70 and 71 and the teeth cooperate to exert combined shearing and compressive forces on larger articles. Thus, the cracking machine operates efficiently and economically with articles of various sizes and requires little or no attention.

It will be apparent that as long as the proper relationship is maintained between the channels 70 and 71 of the rollers 10 and 11, the machine will crack the pits 65 with maximum efficiency not only from the standpoint of releasing whole kernels but also from the standpoint of minimizing mashing of the kernels into the fragments of the shells of the pits. In order to maintain the proper relationship between the channels 70 and 71, the sprocket 33 is preferably adjustably mounted on the shaft 21 to permit occasional adjustments of the positions of the channels 71 relative to the channels 70 if required. The sprocket 33 may be adjustably secured to the shaft 21 by means of a suitable set screw arrangement, for example, which is not specifically shown in the drawings but which is well known in the art.

In order to insure the proper relationship between the channels 70 and 71, it is important that the peripheral speeds of the rollers 10 and 11 be so related to the spacings of the channels 70 and 71 that the proper relationship is maintained. In the particular construction illustrated the ratios of the diameter and peripheral speed of the roller 10 to those of the roller 11 are 2 to 1 so that the ratio of the spacing of the channels 70 to that of the channels 71 must also equal 2 to 1. However, it will be understood that the diameter and peripheral speed ratios and the channel spacing ratios may be any desired value, assuming that both rollers 10 and 11 are driven at the same rotational speeds. However, it will also be understood that the rollers 10 and 11 need not be driven at the same rotational speeds since any desired peripheral speed ratio may be obtained by driving the rollers at suitable rotational speeds which may not be the same, it being apparent, therefore, that any desired diameter ratio may also be employed. Thus, any desired ratio of rotational speeds may be employed so long as the relative peripheral speeds of the rollers 10 and 11 are so related to the relative spacings and numbers of the channels 70 and 71 that the teeth 72 and 73 mesh properly at all times. Thus, it will be insured that each tooth 72 on the roller 10 is in the proper position with respect to each tooth 73 on the roller 11 to insure that the desired compressive and shearing actions are attained.

In the particular construction illustrated, it will be noted that the reference line E—E interconnecting the axes of rotation A—A and B—B is horizontal as best shown in Fig. 2. However, it will be understood that the construction of the cracking machine may be such that the reference line E—E is inclined, if desired. Tests have indicated that inclining the reference line E—E to the right approximately 15 degrees as viewed in Fig. 2, the roller shaft 21 being at a lower elevation than the roller shaft 20, appears to make for more effective operation. The inclination of the reference line E—E is of importance only when the peripheral speed of the roller 11 is such that the pits 65 tend to fall at a speed which is considerably faster than the peripheral speed of the roller 11, thus preventing proper alignment of the pits. Inclining the reference line E—E so that the axis of the roller 11 is below that of the roller 10 decreases the distance through which the pits 65 fall and thus decreases the speed thereof. Thus, by suitably inclining the reference line E—E, the proper relationship between the speed of the pits 65 and the peripheral speed of the roller 11 may be attained to insure proper alignment of the pits with respect to the rollers 10 and 11. However, I do not intend to be limited to the particular reference line positions mentioned herein since various others may be employed.

Figure 7:
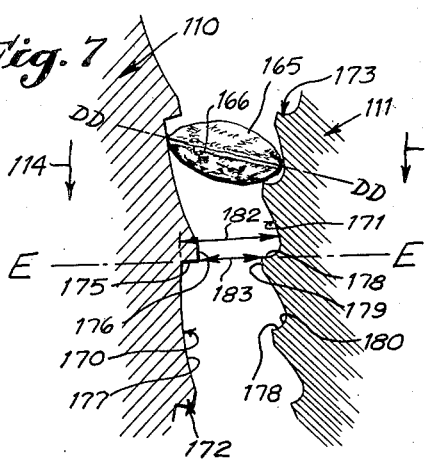
Figs. 7 and 8 are views which are similar to Figs. 4 and 5, respectively, and illustrate the details of and the operation of cracking members which are particularly adapted for cracking apricot pits.
Figure 8:
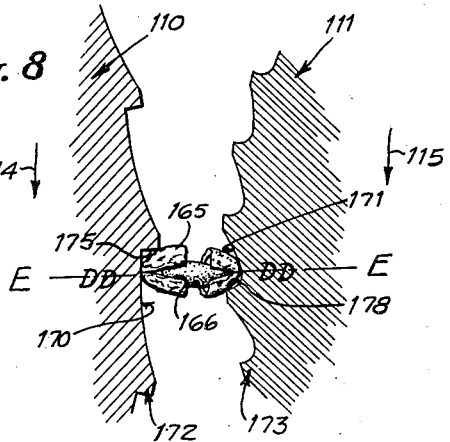

The corrugated rollers illustrated in Figs. 7 and 8, which are identified by the numerals 110 and 111, are similar to the rollers 10 and 11, respectively, with the exception of the configuration of the corrugations thereon as will be described in detail hereinafter. Thus, the rollers 110 and 111 are driven at the same rotational speeds in the directions indicated by the arrows 114 and 115, respectively, by the rotating means 12 so that the ratio of the peripheral speed of the roller 110 to that of the roller 111 equals the ratio of the respective diameters thereof, the peripheral speed of the roller 110 exceeding that of the roller 111. The rotating means 12 synchronizes the rollers 110 and 111 in the same manner as that previously described.

Figure 6:
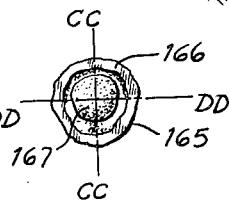
Fig. 6 is a plan view of one-half of another fruit pit.

The rollers 110 and 111 are particularly adapted for cracking fruit pits such as apricot pits 165, one-half of a typical apricot pit being illustrated in Fig. 6. Although substantially circular, the apricot pit 165 may be regarded as having major and minor axes CC—CC and DD—DD, respectively, which are disposed in the natural cleavage plane 166 thereof and which coincide with the maximum length and width thereof, respectively, as previously described in connection with the description of the peach pit 65. The pit 165 contains a kernel 167 having a maximum length and width which may be regarded as coinciding with the major and minor axes CC—CC and DD—DD for convenience as previously described.

The rollers 110 and 111 are provided with grooves or channels 170 and 171 therein, respectively, which define teeth 172 and 173, respectively, the teeth being parallel to the axes of rotation A—A and B—B. Each tooth 172 includes a radial face 175 and a tangential face 176, the radial face of one tooth being connected to the tangential face of an adjacent tooth by a concave face 177 of reverse curvature. Each tooth 173 similarly includes a radial face 178 and a tangential face 179, the radial face of one tooth being connected to the tangential face of an adjacent tooth by a concave face 180 of reverse curvature. The spacing between the rollers 110 and 111 and the depth of the channels 170 and 171 is such that the maximum clearance between a channel 170 in the roller 110 and an opposite or substantially opposite channel 171 in the roller 111 is equal to or less than the average maximum width of the pits 165, the maximum clearance which is indicated by the dimensional arrow 182 of Fig. 7, being measured substantially along the reference line E—E, which is perpendicular to and intersects the axes of rotation A—A and B—B of the rollers. The maximum clearance between a tooth 172 on the roller 110 and an opposite or substantially opposite tooth 173 on the roller 111 is equal to or greater than the average maximum width of the kernels 167, the minimum clearance being measured substantially along the reference line E—E and being indicated by the dimensional arrow 183 of Fig. 7. The spacing of the teeth 172 on the roller 110 is equal to or greater than the average maximum length of the kernels 167.

The rollers 110 and 111 simultaneously compress and shear the pits 165 in the same manner as that previously described in connection with the description of the operation of the rollers 110 and 111, a detailed description of the operation of the rollers 110 and 111 being unnecessary, therefore.

Thus, my invention achieves a combined compressive and shearing action by employing rollers which rotate in opposite directions at different peripheral speeds. The cracking action resulting from the combined shear and compression insures the fracture of substantially all of the pits, and the design of the corrugations or teeth insures a high percentage of undamaged kernels.

Although I have described exemplary applications of the fundamental principles of my invention to machines for cracking peach and apricot pits, it will be understood that these principles may be applied to machines for cracking various other fruit pits and various other articles such as nuts, for example. I do not intend, therefore, to be limited to the specific disclosures contained herein since various changes, modifications, and substitutions may be incorporated in the exemplary embodiments disclosed without departing from the spirit of the invention, and I hereby reserve the right to all such changes, modifications, and substitutions as properly come within the scope of my appended claims.

I claim as my invention:

1. In a machine for cracking an article having a major axis and a minor axis, the combination of: spaced, primary and secondary cracking rollers having parallel axes of rotation, each of said rollers having a plurality of channels therein to provide peripherally spaced teeth which are parallel to said axes of rotation, the peripheral spacing of said teeth on said primary roller being greater than that of said teeth on said secondary roller, the maximum clearance between a channel in one of said rollers and an opposite channel in the other of said rollers being less than the approximate width of the article as measured along the minor axis thereof, said maximum clearance between said opposite channels being measured along a reference line which is perpendicular to and intersects said axes of rotation; and means for rotating said rollers in opposite directions at rotational speeds such that the ratio of the peripheral speed of said primary roller to that of said secondary roller is precisely equal to the ratio of said peripheral spacing of said teeth on said primary roller to that of said teeth on said secondary roller, each of the successively advancing teeth on said primary roller substantially registering with and having the same position with relation to each of the successively advancing teeth on said secondary roller at said reference line, the relative position of said primary roller teeth and said secondary roller teeth at said reference line being such that a combined shearing and compressing action is produced on the article to be cracked.

2. In a machine for cracking an article, the combination of: a pair of spaced cracking rollers having parallel axes of rotation; a plurality of peripherally spaced teeth on each of said rollers, said teeth being parallel to said axes of rotation, and each of said teeth being provided with a radial face thereon which is adapted to engage the article, the ratio of the peripheral spacing of said teeth on one of said rollers to that of said teeth on the other being greater than unity; and means for rotating said rollers in synchronism and in opposite directions at rotational speeds such that the ratio of the peripheral speed of said one roller to the peripheral speed of said other roller equals said ratio of said peripheral spacings of said teeth, each of the successively advancing teeth on said one roller substantially registering with and having the same position with relation to each of the successively advancing teeth on said other roller at a reference line which is perpendicular to and intersects the parallel axes of rotation of said rollers, whereby said radial face on a tooth on said one roller and said radial face on an opposite tooth on said other roller engage the article to shear the article, the article simultaneously being compressed between said rollers.

3. In a cracking machine, the combination of: a frame; spaced, parallel, primary and secondary rollers rotatably mounted on said frame; a plurality of longitudinal, peripherally spaced teeth on each of said rollers; and means for rotating said rollers in opposite directions at such rotational speeds that the peripheral speed of said primary roller exceeds that of said secondary roller and is related thereto according to the equation $$V/v = Dt/Td$$

wherein the symbols $V$ and $v$ represent the peripheral speed of said primary and secondary rollers, respectively, wherein the symbols $D$ and $d$ represent the diameter of said primary and secondary rollers, respectively, and wherein the symbols $T$ and $t$ represent the number of teeth on said primary and secondary rollers, respectively, each of the successively advancing teeth on said primary roller substantially registering with and having the same position with relation to each of the successively advancing teeth on said secondary roller at a reference line which is perpendicular to and intersects the parallel axes of rotation of said rollers, the relative positions of said primary roller teeth and said secondary roller teeth being such that a combined shearing and compressing action is produced on the article to be cracked at said reference line.

4. In a cracking machine, the combination of: a frame; spaced, primary and secondary rollers mounted on said frame for rotation about parallel axes, each of said rollers having a plurality of longitudinal, peripherally spaced teeth thereon, the ratio of the peripheral spacing of the teeth on said primary roller to that of the teeth on said secondary roller being greater than unity; and means for rotating said rollers in opposite directions at such rotational speeds that the ratio of the peripheral speed of said primary roller to that of said secondary roller is precisely equal to said ratio of said peripheral spacings of said teeth, each of the successively advancing teeth on said primary roller substantially registering with and having the same position with relation to each of the successively advancing teeth on said secondary roller at a reference line which is perpendicular to and intersects the parallel axes of rotation of said rollers, the relative positions of said primary roller teeth and said secondary roller teeth being such that a combined shearing and compressing action is produced on the article to be cracked at said reference line.

5. A cracking machine as set forth in claim 4 wherein said primary roller is of greater diameter than said secondary roller.

6. A cracking machine as set forth in claim 4 wherein the diameter of said primary roller is twice that of said secondary roller, and wherein said peripheral speed ratio and said tooth spacing ratio are each equal to two.

7. In a machine for cracking an article, the combination of: a frame; spaced, parallel, horizontal, primary and secondary rollers rotatably mounted on said frame; a plurality of longitudinal, peripherally spaced teeth on each of said rollers; means for rotating said rollers in opposite directions in such a manner that the upper peripheral portions thereof move toward each other and at such rotational speeds that the peripheral speed of said primary roller exceeds that of said secondary roller, whereby the article to be cracked, when disposed between said rollers, is subjected to a compressive force by said rollers and to a shearing force by said teeth; and means for feeding the article to be cracked onto said secondary roller at a point thereon spaced from said primary roller so that the article is carried between said rollers by said secondary roller, each of the successively advancing teeth on said primary roller substantially registering with and having the same position with relation to each of the successively advancing teeth on said secondary roller at a reference line which is perpendicular to and intersects the parallel axes of rotation of said rollers, the relative positions of said primary roller teeth and said secondary roller teeth being such that said combined shearing and compressing action is produced on the article to be cracked at said reference line.

8. A cracking machine as set forth in claim 7 wherein the diameter of said primary roller is greater than that of said secondary roller.

9. A cracking machine as set forth in claim 7 wherein the ratio of the peripheral spacing of the teeth on said primary roller to that of the teeth on said secondary roller is precisely equal to the ratio of the peripheral speed of said primary roller to that of said secondary roller.

ROBERT T. COLLIER.

REFERENCES CITED

The following references are of record in the file of this patent:

UNITED STATES PATENTS

| Number | Name | Date |
| --- | --- | --- |
| 251,217 | Gray | Dec. 20, 1881 |
| 271,518 | Rickerson | Jan. 30, 1883 |
| 350,814 | Coxe | Oct. 12, 1886 |
| 504,244 | Read | Aug. 29, 1893 |
| 1,000,913 | Hovendick | Aug. 15, 1911 |
| 2,144,841 | Glaser | Jan. 24, 1939 |